June 25, 1957 J. C. HOBBS 2,797,063
GATE VALVE
Filed June 12, 1952 3 Sheets-Sheet 2
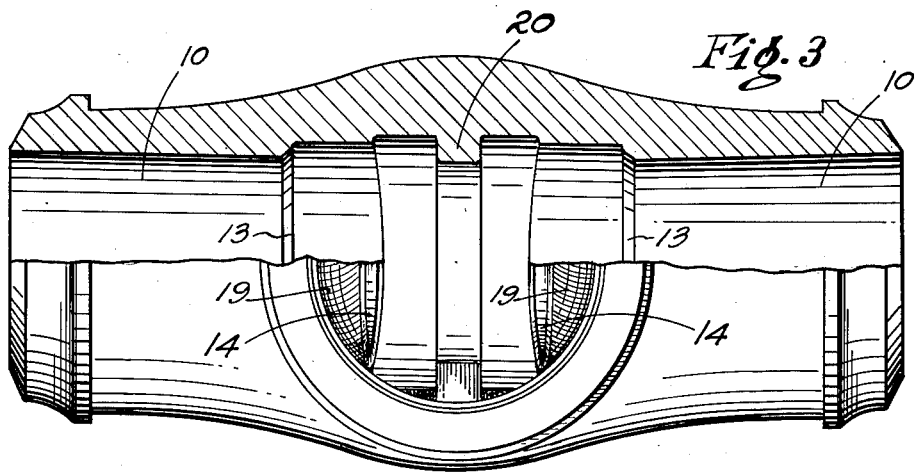
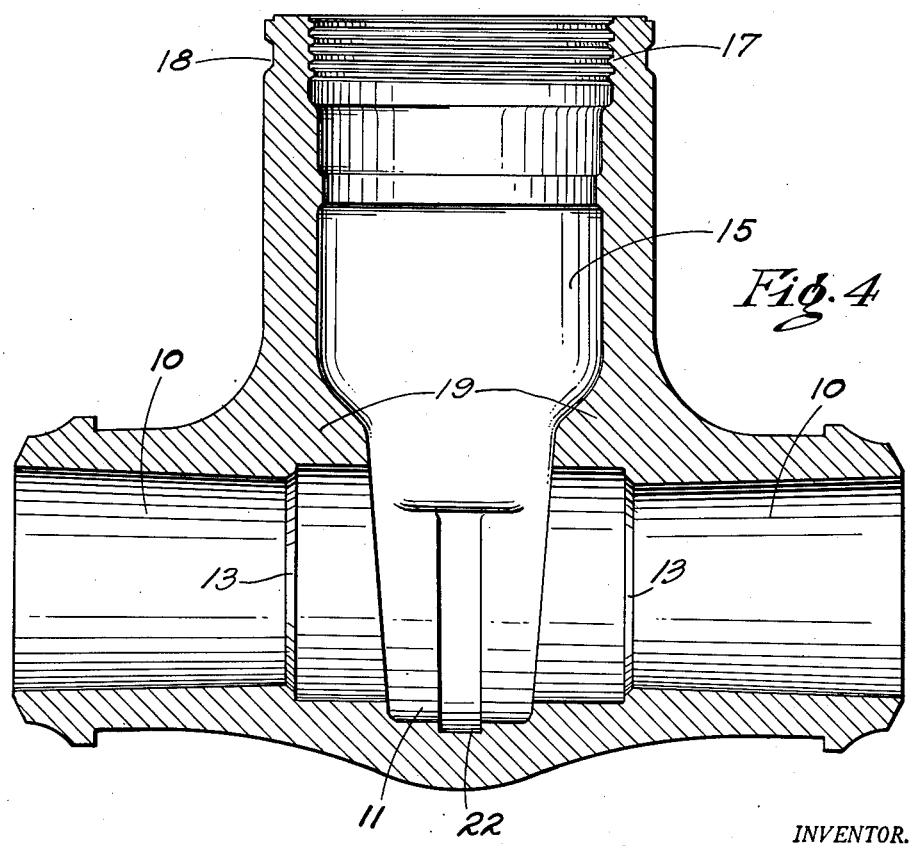
INVENTOR.
JAMES CLARENCE HOBBS
BY
ATTORNEYS

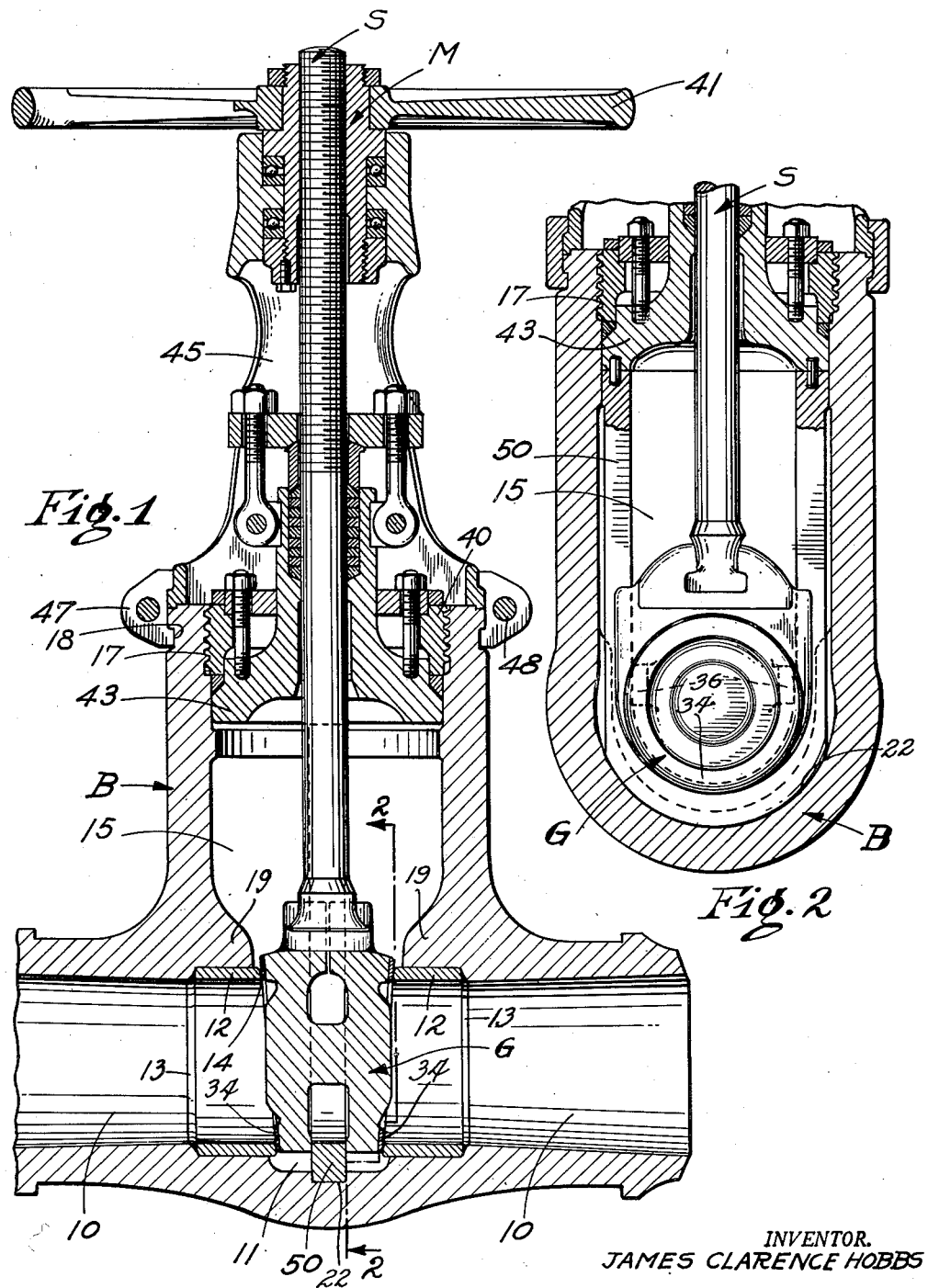

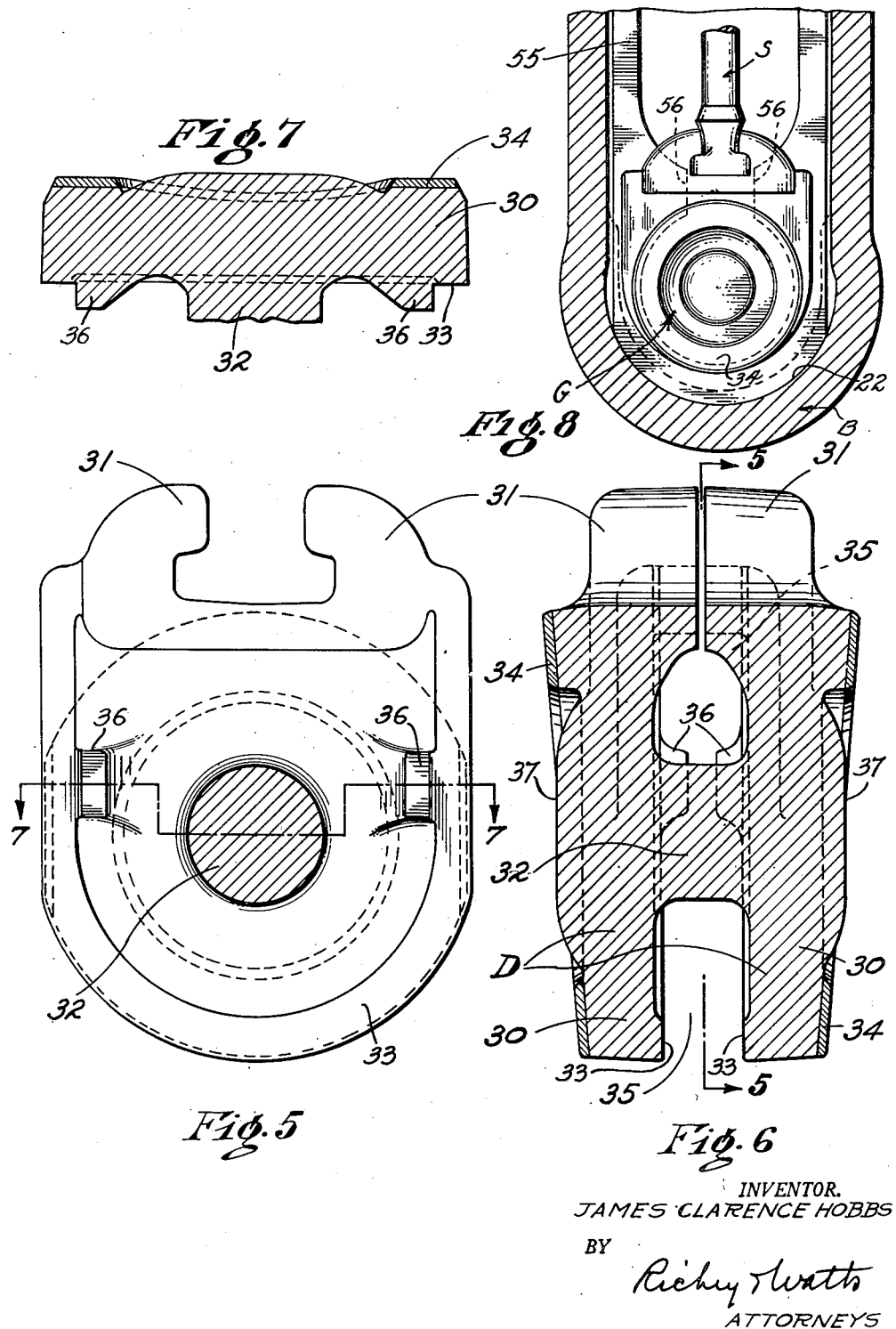

United States Patent Office 2,797,063
Patented June 25, 1957

2,797,063
GATE VALVE
James Clarence Hobbs, Coral Gables, Fla.
Application June 12, 1952, Serial No. 293,193
17 Claims. (Cl. 251—327)

The present invention relates generally to valves and is particularly concerned with gate valves of novel design and construction, and with novel gate valve elements.

Gate valves, especially in high pressure systems, have always presented difficult problems of manufacture and maintenance. Their manufacture has always been very difficult due to the precision necessary in forming the sealing surfaces and because of the warpage of the valve bodies which is attributable to a variety of things, including uneven strains set up during casting or welding operations. Even if a valve is originally tight fitting and does not leak, it invariably soon loses these qualities in use due to uneven wear on sealing surfaces resulting from disk motion, fluid cutting or unequal expansion of the various parts of the valve under varying conditions of temperature and pressure. Prior efforts to solve these problems and make production of leakless valves routine, simple and inexpensive, and to preserve the tightness of the disks and sealing surfaces of such valves in use for long periods, have heretofore invariably failed.

Furthermore, there has been extremely serious difficulty experienced in the use of gate valves in high temperature-high pressure systems due to temperature differentials in the parts of the valves which cause seizing or freezing of the parts so that opening of the valves is often very difficult. Because of this freezing, valve actuating means are constructed to meet the stresses involved in opening valves, which are much greater than the stresses incurred in closing the valve. There has consequently been a persistent demand for means which would minimize or eliminate freezing difficulties in gate valves and enable a reduction in the size and weight of valve actuating parts.

In addition there has long been an insistent demand for gate valves of lighter body construction having strength substantially the same as or greater than conventional gate valve bodies.

The valves of the present invention comprise elements which are entirely new and differ in construction, mode of operation and results from those heretofore known. These present valves, moreover, fully respond to the foregoing demands heretofore unmet, and yet have all the desirable characteristics of the gate valves of the prior art. Because of the method of their construction and their design, warpage in their production and in their use is held to a minimum below that customarily suffered in valves of the prior art, and such warpage as does occur has no important bearing upon the usefulness of these new valves due to the fact that it is compensated for in advance and sealing may be effected regardless of the extent of distortion of the sealing surface of the valve body. My novel, flexible gate is partly responsible for this advantage of valves of my present invention. This one piece gate combines adequate rigidity and strength for effective sealing under a wide range of fluid temperatures and pressures with sufficient flexibility to insure ready and complete sealing under relatively low sealing loads and with resultant greatly reduced wear on the highly finished sealing surfaces of gates and seats. The new and surprising results of this invention are also partly traceable to the provision of elongated tubular seats which are attached at their remote ends to the valve body.

By virtue of this invention, the freezing difficulty in gate valves and the consequent need for valve stems and related actuating parts of substantially heavier construction than required for closing the valves, can be eliminated.

Stresses and strains in gate valves, which are attributable to sharp temperature differentials in various parts of the valves, are either entirely eliminated or they are very materially reduced in my valves. The valves of this invention are not undesirably affected in use by temperature differentials as are conventional valves due to the fact that in my valves there are no large masses of metal serving as heat reservoirs and therefore as potential sources of temperature strain in the valves. There are in my present valves no reinforcing rib-like portions or flange portions which would cause heat differentials and stresses between parts of the body comparable in extent to those present in ordinary high temperature and high pressure systems.

My valves have the further distinct advantage of enabling a considerable reduction in the ratio of the internal diameter of the body in the region of the gate to the diameter of the fluid passage through the body which permits a smaller valve body and a smaller pressure closure area of the valve.

A further important advantage of valves of my invention over those presently in general use is in enabling flow of fluid through the valves with minimum turbulence. The guides for the gates of my valves are either integrally formed in the valve bodies in such a way as to define a substantially continuous smooth fluid way with the passageways for fluid within the bodies, or are adapted to be received in a recess in the valve body and are not disposed in the path of fluid flow when the valve is open.

Those skilled in the art will gain a further understanding of this invention by referring to the drawings accompanying and forming a part of this specification, in which:

Fig. 1 is an elevational view in section of one form of gate valve of this invention;

Fig. 2 is a fragmentary view taken on line 2—2 of Fig. 1;

Fig. 3 is a plan view, partly in section, of one form of valve body of this invention with certain parts removed;

Fig. 4 is a sectional elevational view of another form of valve body with certain parts removed;

Fig. 5 is a view taken on line 5—5 of Fig. 6;

Fig. 6 is a sectional view of a valve gate of this invention;

Fig. 7 is a view taken on line 7—7 of Fig. 5; and

Fig. 8 is a fragmentary view of a modified form of gate and guide.

The valves of this invention comprise a gate valve body B including tubular seats, a gate G having disks D which are movable relative to each other, and closure means M including a valve steam S for moving the gate G relative to the valve body B.

The valve body B comprises a longitudinally extending cylindrical portion and a transversely extending cylindrical portion which defines a crotch with the longitudinally extending portion. The longitudinally extending portion is provided with a pair of coaxially disposed passages 10 for fluid and a chamber 11 disposed in the mid-section of the body between the passages 10 and has wall portions of gradually reduced thickness from said crotch to its ends and from said crotch to a point opposite the transversely extending portion. At their inner ends the passages 10 are enlarged and elongated cylindrical inserts or tubular valve seats 12 of Stellite, or similar hard and wear-resistant metal, are disposed therein and secured to the body to define ports 14 between the passages and chamber 11. The beveled surfaces 13, shown clearly in Figs. 3 and 4, and indicated in Fig. 1, are provided for weld metal used to weld the outer ends of tubular seats 12 in place in the valve body.

The transversely extending portion of the body is provided with an axially disposed aperture or valve access opening 15, which communicates with chamber 11 and is designed to receive elements of the means M, and has threads 17 cut into the inner surface of the outer open end of said portion. The outside surface of said transversely extending portion is provided with an annular groove 18 opposed to the threads 17. At the intersection of the transversely and longitudinally extending portions, substantially straight transversely extending bridges 19 are formed in valve access opening 15.

The valve body illustrated in Fig. 3 is provided with an integrally formed guide or rib 20 which is centrally located between ports 14. The guide 20 is of substantially U-shape, extending from a point within aperture 15 through the arc defined by the wall of chamber 11 to a point in aperture 15 diametrically opposite to the first point. The curved portion of guide 20 is substantially coaxial with and equal in diameter to the ports 14.

The valve body illustrated in Figs. 1, 2 and 4 is provided with a recess 22 instead of an integrally formed guide. This recess is centrally located in the wall of chamber 11 between the ports 14, and extends as an arcuate groove around the wall of the chamber 11 and terminates at points within the chamber and above the axis of ports 14. As shown in Fig. 1, recess 22 is somewhat less than half as deep as the height of the guide to be disposed therein, but has substantially the same width dimension as said guide so that the guide will be received in the recess in tight fitting engagement with the walls of said recess.

Gate G comprises two disks 30 provided with extensions 31 to form arms or lugs for engagement with the end of a valve stem S and are connected integrally by a hub 32 extending between their opposed surfaces. On their outer surfaces, the disks are provided with annular rings 34 of Stellite or other hard, wear-resisting metal which provide seating surfaces. These rings are of substantially the same shape as ports 14, are preferably attached to the disks as by welding and have greater outside diameters and smaller inside diameters than the tubular seats 12. Thus the rings may have sealing contact with the valve seats in any one of several positions. Since the ends of the seats 12 are in planes which converge inwardly from the valve axis opening 15 and the seating faces 34 are to lie substantially parallel to those planes, the disks increase in thickness from the portions opposite projections 31 with the greatest thickness being adjacent to those projections so as to position the seating faces 34 properly for engagement with the tubular seats 12.

The opposed or inner surfaces of the disks are cored out to leave edge surfaces 33 which are machined to form a U-shaped groove to receive a guide later to be described. As shown in Figs. 5, 6 and 7, the disks are provided with opposed pairs of lugs 36 positioned at the inner edges of the parallel portions of guide surfaces 33 for a purpose presently to be described. The opposed or inner surfaces of the disks are substantially parallel. Preferably the outer surfaces are so shaped that the midportions 37 of the disks are symmetrical about the axis of the hub and have a minimum thickness at their outer peripheries which is approximately the same as that of the thinnest portions of the disks, this minimum thickness being at the bottom of the annular recess in the outer surfaces of the disks at the inner edges of the rings 34. By reason of this symmetry and annular place of uniform minimum thickness, the midportions 37 of the disks tend to deflect when forces are applied which will deflect the hub. In other words, deflection-producing forces applied to the gate will be absorbed partly by deflection of the hub and partly by deflection of the midportions of the disks.

The gate G preferably consists of cast steel having a composition suitable for the service conditions to which the gate will be subjected in use. Since widely different temperatures and pressures may be encountered in different service conditions, compositions are selected which will best withstand those conditions. Gates embodying the present invention may, if desired, be composed of other metals suitable to the service conditions to be encountered. A steel which has been found to be satisfactory for use with steam at 1000° F. and 2000 pounds per square inch had approximately the following amounts of ingredients: C .14%, Mn .60%, P .03%, S .03%, Si .5%, Cr 2.25% and Mo 1.0%.

The gate G may be made as follows: After casting, the surfaces to which the rings 34 are to be applied are prepared if necessary for those rings and then the rings are attached to the disks, preferably by being welded thereto. Since the casting may contain some unrelieved strains due to the casting or welding operations, it is preferable to heat treat the gate casting after welding to relieve any such residual strains. Then the surfaces 33 are machined to size and the seating faces 34 are ground. Finally, the projections 31 are cut apart from each other midway between the disks as shown in Fig. 6.

It will be noted, by reference to Figs. 5, 6 and 7, that the disks 30, rings 34 and hub 32 are coaxial; that the hub is out of contact with the stem which engages only the disks; that hub 32 is symmetrical in cross-section, in this instance being cylindrical; that hub 32 has a diameter about one-third of that of the disks and considerably less than the inside diameter of the rings 34; that the hub does not overlap any part of rings 34 when they are in engagement with the seats 12; that the length of the hub is slightly less than its diameter and that the minimum thickness of the disks is approximately one-half the diameter of the hub.

It is to be understood that the flexibility of the gate of this invention depends on the dimensions of the hub and disks. The deflection of the gate which takes place when a force is applied to a point on the seating surface of one of the disks varies with the length of the hub and the diameter of the seating surfaces and inversely with the diameter of the hub and the thickness of the disks. Forces which are so applied include the pressure forces acting against the exterior faces of either, or both, of the disks as would occur when the valve is closed; the forces with which the disks are pressed against the seats to secure the necessary tightness; and the forces occurring in the valve due to thermal expansion of various parts of the valve body, seats and disks.

The proper selection of dimensions for the several parts may be easily determined. The diameter of the disks is dictated by the diameter of the valve ports, it being necessary to provide disks carrying rings 34 whose inside and outside diameters are, respectively, smaller and greater than those of the seating surfaces on the tubular seats 12. This is important since normally the gate is made to seal in approximately the position shown in Fig. 1 when the gate is new, and must be able to seat as the gate is moved farther into the valve body by reason of wear or refinishing of the sealing surfaces. The thickness of the disks is determined by the fluid pressure which they must resist without being deformed to the extent of permitting leakage of fluid therepast. The hub should be small enough in cross-section to permit the desired flexing of the disks and yet large enough to withstand, without permanent deformation, forces applied to the disks. The diameter of the hub may range between about one-fifth and two-thirds of the disk diameter and should be less in diameter than the minimum diameter of the seating surfaces of the seats. Any overlapping of the hub with the sealing surfaces of the disk and valve seats will prevent flexing of the disks at the places of overlap. A disk so proportioned is sufficient to give the desired strength and flexibility.

Closure means M includes a valve stem S, a hand wheel 41 operatively engaged with the stem, a bonnet 43 of the pressure-sealing type disposed in the open end of aperture 15, a retaining ring 40 in threaded engagement with the threads 17, and a yoke 45 which is secured in position relative to the body by means of a bi-flanged split ring 47. One flange of ring 47 is disposed in groove 18, while the other flange grips the lower portion of yoke 45. The two semi-circular parts of ring 47 are suitably joined by bolts disposed in opposed enlarged ends of said parts.

The valve stem S, as aforementioned, is provided with an appropriately shaped end portion to be locked in engagement with the top of the gate G, and is further provided with a threaded opposite end portion for engagement with the hand wheel 41 so that rotational movement of the wheel will result in axial, non-rotatable movement of the stem relative to the valve body.

As noted above and shown in Figs. 1 and 2, a U-shaped guide 50 has its curved intermediate portion extending into recess 22 in the valve body and its parallel side portions extending outwardly in the valve access opening 15 to the bonnet 43, to which their outer ends may be secured. The outer surfaces of these side parts of the guide are out of contact with the valve body for part of their length, a fact which reduces the amount of necessary machining. Preferably the inner arcuate surface of the guide is coaxial with seats 12 and flush with the inner surfaces of those seats. This guide 50 is accurately machined and provided with flat, parallel side surfaces to engage with the flat surfaces 33 of gate G and flat inner surfaces to engage with the outer surfaces of lugs 36. Thus guide 50 serves as a means of accurately positioning the gate G throughout its full range of movement.

In Fig. 8 is shown, fragmentarily, a modified form of gate and guide. In this instance the gate is like that shown in Figs. 5, 6 and 7 except that the lugs 36 have been omitted and the surfaces 33 are continuous circumferentially and the guide 55 is like guide 50 except that it has projections 56 extending inwardly to engage the surfaces 33 over arcs of more than about 300° when the gate is in closed position, these projections being spaced apart a sufficient distance to permit the end of stem S, attached to the gate, to pass therebetween when the gate is being moved into or out of closed position.

In constructing a valve embodying the present invention, for example, that shown in Figs. 1 and 2, several machining operations are carried out on the valve body with a single set up. The fluid passages 10 are bored out to provide spaces for the tubular valve seats 12 and also to provide recess 22 for guide 50. The valve seats 12 are separately machined, are inserted into the recesses provided therefor, are located by a jig and are welded at their remote ends to the valve body. The gate G and guide 50 are also separately machined. Then guide 50 is placed in position and the gate is assembled therewith.

In machining the valve body of Fig. 3 with its integral guide 20, the same procedure may be followed except that in this case it is necessary to machine the inner and opposite side surfaces of the guide as a part of the operation of the machining of the valve body rather than as an independent outside operation as is the case with removable guides such as those of Figs. 2 and 8.

As stated above, the gate is so dimensioned that when new it will seal in about the position shown in Fig. 1. When the gate is being moved from its position in the access opening 15, i. e., from valve open position toward the position shown in Fig. 1, parts of rings 34 may engage only parts of the valve seats. As the gate is pushed in further, the pressure of the seats on these parts of the rings increases and causes the disks to deflect toward each other with coincident outward movement of the parts of the disks which are not in contact with the valve seats, such deflection being permitted by the space between the flat surfaces 33 of the disks and the opposed surfaces of the guide. As the inward movement of the gate continues, such deflection continues with ultimate complete sealing engagement of rings 34 with the valve seats. This action is repeated every time the valve is closed. Although wear of the sealing surface is inevitable, it is lessened by the fact that the gate is flexible and hence this invention greatly extends the normal life of gate valves.

An important result of the attaching of the tubular valve seats to the valve body at places remote from the ends which seat against the gate is that compensation is thereby provided for differences in the temperatures of valve body, gate and tubular seats. When the valve body is subjected to rising temperatures the longitudinally extending portions expand outwardly in opposite directions carrying with them the ends of the tubular valve seats connected thereto; and at the same time the valve seats expand axially toward each other. Similarly, when the temperature of the valve body decreases, the longitudinally extending portions contract, thereby tending to move the anchored ends of the valve seats toward each other, but the valve seats are simultaneously contracting, thereby tending to move the seating surfaces of the valve seats away from each other. When the valve is open and high temperature fluid is flowing therethrough, the tubular seats will be most highly heated, the valve body will be somewhat cooler, and the gate considerably cooler than the port portions of the body. Thus, assuming that the gate is seated while the valve is hot, the pressure between the sealing surfaces will not increase in proportion to the contraction of the valve body in response to decreasing temperature traceable to stopping flow of hot fluid. Hence, the tendency for the gate to be seized in the valve body will be decreased.

This application is a continuation-in-part of my co-pending application Serial No. 705,652, filed October 25, 1946 and now abandoned.

Having thus described the present invention so that others skilled in the art may be able to understand and practice the same, I state that what I desire to secure by Letters Patent is defined in what is claimed.

What is claimed is:

1. A flexible gate for a gate valve comprising two spaced apart disks having annular seating faces on their outer surfaces to engage annular valve seats, and a single hub integral with the disks and approximately coaxial with said seating faces and connecting said disks together, said hub being substantially symmetrical in cross section and deflectable with substantial uniformity relative to its longitudinal axis, having a diameter less than the inner diameter of the seating faces and ranging between about one-fifth and about two-thirds of the outer diameter of the disks, and means for connecting the gate to a valve stem.

2. A flexible gate for a gate valve comprising two spaced apart disks having annular seating faces on their outer surfaces to engage annular valve seats and projections extending outwardly beyond said seating faces to receive and retain a valve stem, and a single hub integral with the disks, remote from said projections, approximately coaxial with the seating faces and connecting said disks together, said hub being substantially symmetrical in cross section and deflectable with substantial uniformity relative to its longitudinal axis, said hub having a diameter less than the inner diameter of the seating faces and ranging between about one-fifth and about two-thirds of the outer diameter of the disks.

3. A flexible gate for a gate valve comprising two spaced apart disks having annular seating faces on their outer surfaces to engage annular valve seats, and a single hub integral with the disks and approximately coaxial with said seating faces and connecting said disks together, said hub being substantially symmetrical in cross section and deflectable with substantial uniformity relative to its longitudinal axis, the outer surface of each disk having an annular recess adjacent to the inner periphery of its seating face, each disk having substantially the same thickness at the bottom of said recess throughout its annular extent, and means remote from said hub for connecting the gate to a valve stem.

4. A flexible gate for a gate valve comprising two spaced apart disks having annular seating faces on their outer surfaces to engage annular valve seats, and a single hub integral with the disks and approximately coaxial with said seating faces and connecting said disks together, said hub being substantially symmetrical in cross section and deflectable with substantial uniformity relative to its longitudinal axis, the outer surface of each disk having an annular recess adjacent to the inner periphery of its seating face, the portions of said disks lying within said recesses being substantially symmetrical about the axis of said hub, and means remote from said hub for connecting the gate to a valve stem.

5. A flexible gate for a gate valve comprising two spaced apart disks having annular seating faces on their outer surfaces to engage annular valve seats, said disks having parallel, opposed surfaces disposed within their outer peripheries and spaced apart sufficiently to provide deflection permitting clearance with a guide, and a single hub integral with the disks and approximately coaxial with said seating faces and connecting said disks together, said hub being substantially symmetrical in cross section and deflectable with substantial uniformity relative to its longitudinal axis, having a diameter less than the inner diameter of the seating faces and ranging between about one-fifth and about two-thirds of the outer diameter of the disks, and means integral with the disks adjacent to their peripheries for connecting the gate to a valve stem.

6. A flexible gate for a gate valve comprising two spaced apart disks having annular seating faces on their outer surfaces to engage annular valve seats, said disks having guide engaging, parallel, opposed surfaces within their outer peripheries spaced apart sufficiently to provide deflection permitting clearance with the sides of a guide and parallel surfaces at right angles to said opposed surfaces, a single hub integral with the disks and approximately coaxial with said seating faces and connecting said disks together, said hub being substantially symmetrical in cross section and deflectable with substantial uniformity relative to its longitudinal axis, having a diameter less than the inner diameter of the seating faces and ranging between about one-fifth and about two-thirds of the outer diameter of the disks, and projections extending outwardly beyond said seating faces for connecting the disks to a valve stem.

7. A gate valve comprising a single piece body having a valve access opening and gate seats connected thereto, a U-shaped metal guide slidable through said opening and having a curved mid-portion and parallel end portions, said end portions lying adjacent to the inner surface of said opening, the opposite side surfaces of said guide being substantially parallel and the opposed inner surfaces of said end portions being substantially parallel, a gate movable in said body and having opposed guide surfaces, said side and inner surfaces being engageable with said guide surfaces of the gate, and means in said body and engaging said guide for fixing the guide against movement relative to the seats.

8. A gate valve comprising a single piece body having a valve access opening and a recess in the wall opposed thereto, a U-shaped metal guide slidable through said opening and into said recess and having a curved mid-portion lying close to the side surfaces of said recess and parallel end portions lying close to the surface of said opening, a gate movable in said body and having opposed guide surfaces, the opposite side surfaces of said guide being substantially parallel, and the opposed inner surfaces of said end portions being substantially parallel, said side and inner surfaces of the said guide being engageable with guide surfaces of the gate.

9. A gate valve comprising a single piece valve body having an access opening and a guide receiving recess in the wall opposed to said opening, a U-shaped metal guide slidable through said opening and into said recess, said guide having a semi-circular mid-portion extending into and having close fitting engagement with opposed surfaces of said recess and parallel end portions lying adjacent to the surface of said access opening, said guide having flat, substantially parallel, opposite side surfaces, and a flexible gate insertable through said opening and including a central hub and two disks connected to the ends thereof, said disks having opposed surfaces which are substantially parallel to said side surfaces of the guide and which have deflection permitting engagement therewith.

10. A gate valve comprising a single piece valve body having an access opening and a guide-receiving recess in the wall opposed to said opening, a U-shaped metal guide slidable through said opening and into the recess, said guide having a semi-circular mid-portion extending into and having close fitting engagement with opposed surfaces of said recess and parallel end portions lying adjacent to the surface of said access opening, said guide having flat, substantially parallel, opposite side surfaces, a flexible gate insertable through said opening and including a central hub and two disks connected to the ends thereof, said disks having surfaces which are substantially parallel to and which have deflection permitting engagement with said side surfaces of the guide, and means in the recess opening engaging and limiting the extent of outward movement of the guide.

11. A gate valve comprising a one piece valve body having an access opening, a recess in the wall opposite said opening and coaxial inlet and outlet passages, coaxial tubular seat members in said passages spaced apart axially and secured to the valve body at their remote ends, said seat members having their remote ends normal to the axis of said passages and their opposed ends having seats disposed in planes at acute angles to said axis and defining an acute included angle to receive a gate, a U-shaped metal guide insertable in said access opening, fixed in said body between projections of the planes of said seats, having machined side surfaces normal to the axis of said passages, and having parallel end portions engaging the walls of the access opening and a curved mid-portion seated in and substantially engaging the opposed surfaces of said recess, and a flexible gate movable into and out of sealing engagement with said seats, said gate comprising two spaced apart disks having annular seating faces on their outer surfaces to engage with said seats, said disks having opposed parallel guiding faces on their inner surfaces spaced apart sufficiently to provide deflection-permitting clearance with the side surfaces of said guide, and a single hub integral with said disks and approximately coaxial with their seating faces and connecting the disks together, said hub being substantially symmetrical in cross section and deflectable with substantial uniformity relative to its longitudinal axis and having a diameter less than the inner diameter of the said seats and ranging between about one-fifth and about two-thirds of the outer diameter of the disks, a valve stem extending into said access opening, and projections on the gate for connecting the valve stem thereto and maintaining the stem out of contact with the hub.

12. A gate valve comprising a one piece valve body having a valve access opening and a recess in the wall opposed thereto, annular valve seat members therein spaced apart axially and secured to the valve body at their remote ends, a U-shaped metal guide in said body between said members, said guide having a curved mid-portion seated substantially in contact with opposed surfaces of said recess and parallel end portions engaging the surface of the access opening near their outer ends, said guide having machined, opposite side, guide surfaces, a valve stem extending into said access opening, and a flexible gate movable into and out of sealing engagement with said valve seat members, said gate comprising two spaced apart disks having annular seating faces on their outer surfaces to engage said seat members and opposed, parallel guiding faces on their inner surfaces to engage with said side surfaces of said guide with deflection-permitting engagement, and a single hub integral with said disks and approximately coaxial with said seating faces and connecting the disks together, being substantially symmetrical in cross section and deflectable with substantial uniformity relative to its longitudinal axis, and having a diameter less than the inner diameter of the seat members and ranging between about one-fifth and about two-thirds of the outer diameter of the disks, and projections extending outwardly from said disks to receive and retain said stem out of contact with said hub.

13. A gate valve comprising a one piece valve body having a valve access opening and a recess in the wall opposed thereto, tubular valve seat members therein spaced apart axially and secured to the valve body at their remote ends, a U-shaped metal guide in said body between said members, said guide having a curved midportion seated substantially in contact with the opposed surfaces of said recess and parallel end portions engaging the surface of the access opening near their outer ends, a bonnet in said access opening and engaging the outer ends of said guide and serving as a stop to limit its outward movement, said guide having machined, opposed inner, and opposite side, guide surfaces, a valve stem extending into said access opening, and a flexible gate movable into and out of sealing engagement with said valve seat members, said gate comprising two spaced apart disks having annular seating faces on their outer surfaces to engage said seat members, said seating faces having outer and inner diameters respectively greater and less than the outer and inner diameters of the seating faces of said valve seats, opposed, parallel, guiding faces on the inner surfaces of said gate to engage with said side surfaces of said guide with deflection-permitting engagement, and parallel surfaces at right angles to said opposed surfaces to engage said inner surfaces of said guide, a single hub integral with said disks and approximately coaxial with said seating faces and connecting the disks together, said hub being substantially symmetrical in cross section and deflectable with substantial uniformity relative to its longitudinal axis and having a diameter less than the inner diameter of the seat members and ranging between about one-fifth and about two-thirds of the outer diameter of the disks, and projections extending outwardly from said disks to receive and retain said stem remote from said hub.

14. A gate valve comprising a one piece valve body, annular valve seat members therein spaced apart axially and secured to the valve body at their remote ends, the adjacent ends of said members having seating faces disposed in planes defining an acute included angle, and a flexible gate movable in said included angle into and out of sealing engagement with said members, said gate comprising two spaced apart disks having annular seating faces on their outer surfaces to engage said annular seat members and a single hub integral with said disks and approximately coaxial with said seating faces and connecting the disks together, said hub being substantially symmetrical in cross section and deflectable with substantial uniformity relative to its longitudinal axis, having a diameter less than the inner diameter of the seat members and ranging between about one-fifth and about two-thirds of the outer diameter of the disks, and means for connecting the gate to a valve stem.

15. A gate valve comprising a one piece valve body having coaxial inlet and outlet passages and a valve access opening, tubular seat members coaxial with each other and with said passages, spaced apart axially and secured to the valve body at their remote ends, said seat members having their remote ends normal to the axis of said passages and having seats at their opposed ends, metal gate guiding means in said access opening, fixed to said body between said seats and having machined, opposite, side surfaces of substantially uniform width normal to the axis of said passages, a gate movable into and out of sealing engagement with said seats and having opposed parallel surfaces engageable with the said machined surfaces, said guiding means serving to guide the gate in its said movements and to resist axial movement of the gate incident to the application of differential pressure to opposite sides of the latter, and a stem connected to said gate and extending out through said access opening.

16. A gate valve comprising a one piece valve body having coaxial inlet and outlet passages and a valve access opening, coaxial tubular seat members in said passages, said seat members having their remote ends disposed normal to the axis of said passages and secured to the valve body and having seats at their opposed ends disposed at an acute angle to said axis and defining an acute included angle to receive a gate, metal gate-guiding means in said access opening, fixed to said body between said seats and having machined side surfaces of substantially uniform width normal to the axis of said passages, a gate movable into and out of sealing engagement with said seats and having opposed, parallel surfaces engageable with said machined surfaces, said guiding means serving to guide the gate in its said movements and to resist axial movement of the gate incident to the application of differential pressure to opposite sides of the latter, and a stem connected to said gate and extending out through said access opening.

17. A gate valve comprising a one piece valve body having a transversely extending portion provided with a valve access opening and a cylindrical portion provided with coaxial inlet and outlet passages and a recess between said passages and normal to the axis of said passages and opposed to said opening, coaxial tubular seat members in said passages spaced apart axially and secured to the valve body at their remote ends, said seat members having their remote ends disposed normal to the axis of said passages and secured to the valve body and having seats at their opposed ends disposed at an acute angle to said axis and defining an acute included angle to receive a gate, metal gate-guiding means insertable in said access opening, having a curved mid-portion seated in said recess and having machined side surfaces of substantially uniform width normal to the axis of said passages, a gate movable into and out of sealing engagement with said seats and having opposed parallel surfaces engageable with said machined surfaces, said guiding means serving to guide the gate in its said movements and to resist axial movement of the gate incident to the application of differential pressure to opposite sides of the latter, and a stem connected to said gate and extending out through said access opening.

References Cited in the file of this patent

UNITED STATES PATENTS

| | | |
|---|---|---|
| 236,780 | Coffin | Jan. 18, 1881 |
| 1,598,265 | Crook | Aug. 31, 1926 |
| 1,732,241 | Murray | Oct. 22, 1929 |
| 1,738,567 | Flodin | Dec. 10, 1929 |
| 1,801,237 | Hanson | Apr. 14, 1931 |
| 1,825,544 | Redding | Sept. 29, 1931 |
| 1,882,227 | Mohr | Oct. 11, 1932 |
| 2,193,922 | Hehemann | Mar. 19, 1940 |
| 2,293,016 | Dopp | Aug. 11, 1942 |
| 2,359,442 | Sandilands | Oct. 3, 1944 |
| 2,565,475 | Cox | Aug. 28, 1951 |
| 2,656,143 | Fantz | Oct. 20, 1953 |